United States Patent [19]

Myers et al.

[11] Patent Number: 5,084,103

[45] Date of Patent: * Jan. 28, 1992

[54] STRENGTH ENHANCING ADDITIVE FOR CERTAIN PORTLAND CEMENTS

[75] Inventors: David F. Myers, Columbia; Ellis M. Gartner, Silver Spring, both of Md.

[73] Assignee: W. R. Grace & Co.-Conn., New York, N.Y.

[*] Notice: The portion of the term of this patent subsequent to Feb. 5, 2008 has been disclaimed.

[21] Appl. No.: 561,754

[22] Filed: Aug. 2, 1990

Related U.S. Application Data

[63] Continuation-in-part of Ser. No. 418,071, Oct. 6, 1989, Pat. No. 4,990,190.

[51] Int. Cl.$^5$ .............................................. C04B 07/02
[52] U.S. Cl. ...................................... 106/727; 106/802
[58] Field of Search ........................ 106/724, 802, 727

[56] References Cited

U.S. PATENT DOCUMENTS

| | | | |
|---|---|---|---|
| 2,437,842 | 3/1948 | Uhler | 106/90 |
| 2,776,901 | 1/1957 | Scripture | 106/90 |
| 2,776,902 | 1/1957 | Scripture | 106/90 |
| 2,776,903 | 1/1957 | Scripture | 106/90 |
| 3,202,521 | 8/1965 | Lorenzen | 106/90 |
| 4,116,706 | 9/1978 | Previte | 106/90 |
| 4,209,336 | 6/1980 | Previte | 106/90 |
| 4,318,774 | 3/1982 | Dodson | 106/708 |
| 4,373,956 | 2/1983 | Rosskopf | 106/725 |
| 4,401,472 | 8/1983 | Gerber | 106/727 |
| 4,473,405 | 9/1984 | Gerber | 106/725 |
| 4,488,910 | 12/1984 | Nicholson et al. | 106/665 |
| 4,519,842 | 5/1985 | Gerber | 106/727 |
| 4,606,770 | 8/1986 | Gerber | 106/727 |
| 4,828,624 | 5/1989 | Valle | 106/727 |
| 4,943,323 | 7/1990 | Gartner et al. | 106/808 |

FOREIGN PATENT DOCUMENTS

| | | |
|---|---|---|
| 867323 | 6/1970 | Italy . |
| 8302938 | 9/1983 | World Int. Prop. O. . |

OTHER PUBLICATIONS

Zement-Kalk-Gips, "Effect of Amino Components on the Setting and Hardening of Portland Cements", Von L. Muller (1974).

*Primary Examiner*—William R. Dixon, Jr.
*Assistant Examiner*—Alan Wright
*Attorney, Agent, or Firm*—Howard J. Troffkin

[57] ABSTRACT

This invention relates to a method of producing enhanced strength portland cements. Under the process of this invention, certain portland cements, in particular those containing at least 4% $C_4AF$ and up to 0.2% of a strength enhancing additive comprising triisopropanolamine, exhibit a marked increase in 7 and 28 day compressive strength. The triisopropanolamine strength enhancing additive may be admixed with cement powder or may be interground as a grinding aid with cement clinker during finish milling.

12 Claims, No Drawings

STRENGTH ENHANCING ADDITIVE FOR CERTAIN PORTLAND CEMENTS

This is a continuation-in-part application of copending application U.S. Ser. No. 418,071, filed Oct. 6, 1989, now U.S. Pat. No. 4,990,190.

BACKGROUND OF THE INVENTION

1. Field of the Invention

This invention relates to an improved portland cement, and more specifically to a hydraulic portland cement containing a strength enhancing additive. The strength enhancing additive of this invention comprises a higher trialkanolamine, which when added and used with a portland cement containing composition provides enhanced 28 day strength to the resultant set or cured composition.

2. Description of the Prior Art

The term cement is used to designate many different kinds of materials useful as binders or adhesives. Hydraulic cements are powdered materials which, when mixed with water, form a "paste" that hardens slowly. If, further mixed with a fine aggregate (e.g. sand), it forms a "mortar" and if mixed with fine and coarse aggregate (e.g. sand and stone) it forms "concrete" which are rock-hard products. These products are commonly referred to as hydraulic cement mixes and are, as discussed herein, formed using portland cement as the cement binder portland cement is distinguished from other cements by the different components of which it is composed, and the requirement that it meet particular standard specifications established in each country (see *Cement Standards of the World*, Cembureau, Paris, Fr.) For example, in the United States, the American Society for Testing and Materials (ASTM), American Association of State Highway and Transportation Officials, as well as other government agencies, have set certain basic standards for cement which are based on principal chemical composition requirements of the clinker and principal physical property requirements of the final cement mix. For purposes of this invention the term "portland cement" is intended to include all cementitious compositions which meet either the requirements of the ASTM (as designated by ASTM Specification C150), or the established standards of other countries.

portland cement is prepared by sintering a mixture of components including calcium carbonate (as limestone), aluminum silicate (as clay or shale), silicon dioxide (as sand), and miscellaneous iron oxides. During the sintering process, chemical reactions take place wherein hardened nodules, commonly called clinkers, are formed. portland cement clinker is formed by the reaction of calcium oxide with acidic components to give, primarily tricalcium silicate, dicalcium silicate, tricalcium aluminate, and a ferrite solid solution phase approximating tetracalcium aluminoferrite. The conventional cement chemists notation uses the following abbreviations:

$CaO = C$
$SiO_2 = S$
$Al_2O_3 = A$
$Fe_2O_3 = F$ thus:
tricalcium silicate = $C_3S$
dicalcium silicate = $C_2S$
tricalcium aluminate = $C_3A$
tetracalcium aluminoferrite = $C_4AF$ After the clinker has cooled, it is then pulverized together with a small amount of gypsum (calcium sulfate) in a finish grinding mill to provide a fine, homogeneous powdery product known as portland cement. Due to the extreme hardness of the clinkers, a large amount of energy is required to properly mill them into a suitable powder form. Energy requirements for finish grinding can vary from about 33 to 77 kWh/ton depending upon the nature of the clinker. Several materials such as glycols, alkanolamines, aromatic acetates, etc., have been shown to reduce the amount of energy required and thereby improve the efficiency of the grinding of the hard clinkers. These materials, commonly known as grinding aids, are processing additives which are introduced into the mill in small dosages and interground with the clinker to attain a uniform powdery mixture. In addition to reducing grinding energy, the commonly used processing additives listed above are frequently used to improve the ability of the powder to flow easily and reduce its tendency to form lumps during storage.

Various other additives may be incorporated into the cement to alter the physical properties of the final cement. For example, alkanolamines such as monoethanolamine, diethanolamine, triethanolamine and the like have been used in large dosages to shorten the set time (set accelerators) as well as enhance the one-day compressive strength (early strength) of cements. However, these additives usually have little beneficial effect on the 28-day strength of the finished cement, and in some cases may actually diminish it. Various other polymeric amines and imines have been used as 28-day cement strength enhancers, however, due to the high costs of these additives, their use is somewhat limited. In many countries, portland cements may contain up to 5% fillers or clinker substitutes. As used herein, the term "filler" refers to an inert material that has no later age strength enhancing attributes; the term "clinker substitute" refers to a material that may contribute to long term compressive strength enhancement, but usually exhibits little or no enhancement of 7 or 28-day compressive strength values. The 28-day compressive strength has particular significance and will be emphasized throughout this invention since it is the strength at this age which is most commonly used to assess the engineering properties of the final cement products.

It has now been discovered that certain tertiary amines classified as tri(hydroxyalkyl) amines having at least one $C_3-C_5$ hydroxyalkyl group (hereinafter referred to as "higher trialkanolamine"), as fully described herein below, surprisingly imparts 7 and 28-day compressive strength enhancing properties to certain portland cements. This discovery includes the use of triisopropanolamine (TIPA), which was previously believed to possess the equivalent cement additive properties as triethanolamine (TEA) (i.e., shortening set times and enhancing one-day compressive strengths,) but, instead, surprisingly exhibits unique 7 and 28-day compressive strength enhancing properties when added to certain hydraulic portland cements. The portland cements suitable for use in this invention are those containing at least 4% tetracalcium aluminoferrite ($C_4AF$) by weight. The enhanced 7 and 28-day strengths exhibited by these cements were unexpected and unobvious since $C_4AF$ was believed to have no cementing value.

SUMMARY OF THE INVENTION

It is an object of this invention to provide a hydraulic cement mix which contains at least one higher alkanolamine in combination with certain portland cements to improve the 7 and 28-day strength of the resultant cured mix.

Another object of this invention is to provide an additive which, when added to the certain portland cements, provides an improved high strength portland cement.

In accordance with the present invention, there has been provided a novel portland cement having at least 4% $C_4AF$ content and a higher alkanolamine, as fully described herein below. The invention is further directed to hydraulic cement mixes which contain a portland cement having at least 4% $C_4AF$, and a higher trialkanolamine to provide improved 7 and 28-day strength.

DETAILED DESCRIPTION

The present invention is directed to a strength enhancing additive, to certain hydraulic portland cement compositions containing the additive and to hydraulic cement mixes which exhibit increased later age compressive strength of the set cement mix. These enhanced strength hydraulic portland cement mixes are prepared by blending a strength enhancing additive into a suitable, hydraulic, portland cement, as described herein below. The additive is comprised of at least one higher trialkanolamine. The term "higher trialkanolamine" shall refer, in the present description and in the appended claims, to tertiary amine compounds which are tri(hydroxyalkyl) amines having at least one $C_3$–$C_5$ hydroxyalkyl (preferably a $C_3$–$C_4$ hydroxyalkyl) group therein. The remaining, if any, hydroxyalkyl groups of the subject tertiary amine can be selected from $C_1$–$C_2$ hydroxyalkyl groups (preferably $C_2$ hydroxyalkyl). Examples of such compounds include hydroxyethyl di(hydroxypropyl)amine, di(hydroxyethyl) hydroxypropylamine, tri(hydroxypropyl)amine, hydroxyethyl di(hydroxy-n-butyl)amine, tri(2-hydroxybutyl)amine, hydroxybutyl di(hydroxypropyl)amine, and the like. The preferred higher trialkanolamines of this invention are triisopropanolamine (TIPA), N,N-bis(2-hydroxyethyl)-N-(2-hydroxypropyl)amine (BHEHPA) and tri(2-hydroxybutyl) amine (T2BA). Mixtures of higher trialkanolamines can be used.

The subject invention will be further described in terms of (though not limited to) the preferred higher trialkanolamines, (TIPA), (BHEHPA) and/or tri(2-hydroxybutyl)amine (T2BA). The higher trialkanolamines are added to the cement in an amount up to about 0.2%, preferably up to about 0.1%, and most preferably between about 0.005% and 0.03% based on the weight of the cement. The higher trialkanolamine can be used in very small dosages (e.g. as low as about 0.001%) with respect to the cement to enhance the 7 and 28 day strength. The strength enhancement achieved at 7 and 28 days (particularly 28 days) is emphasized in this invention because of its use in standard engineering specifications.

The enhanced strength portland cement compositions of this invention are prepared by adding up to 0.2% of at least one higher trialkanolamine to a portland cement by either intermixing or intergrinding the additive with the cement. As used herein, the terms "intermixing" or "intergrinding" refer to the particular stage of cement processing in which the higher trialkanolamine is added. Since there is little or no apparent loss of the higher trialkanolamines during the grinding process, they may be added to the portland cement clinker during the grinding to form the cement. The resultant cement-higher trialkanolamine composition exhibits pack set inhibition, improved ability of the ground cement powder product to flow easily, and reduced tendency of the cement product to form lumps during storage.

It is also possible to add the higher trialkanolamine directly to powdered cements either prior to, in conjunction with, or after the addition of water when effecting the hydraulic setting of the cement mix. The cement mix, in the form of a paste, mortar or concrete, which is formed from the presently described composition of portland cement having at least 4% $C_4AF$ and at least one higher trialkanolamine in an amount of up to about 0.2% by weight based on the portland cement provides an improved mix which, when set or cured, exhibits enhanced 7 and 28 day compressive strengths. The higher trialkanolamine used in this invention may be supplied in a pure concentrated form, or diluted in aqueous or organic diluents, and may also be used in combination with other chemical admixtures including but not limited to: accelerating admixtures, air entrainers, water-reducing admixtures, retarding admixtures (as defined in ASTM C494), and the like, and mixtures thereof. The additives can be in neat (amine) form or may be in neutralized form such as an acetate, gluconate, sulfate, nitrate, nitrite, and the like. Further, the additives may be converted into ester form (e.g. an acetate ester), since, upon addition to the high pH of a hydrating cement, they will undergo hydrolysis and revert back to the alcohol form.

Suitable portland cements for use in this invention are those that contain at least 4% tetracalcium aluminoferrite ($C_4AF$), preferably greater than 5.5% $C_4AF$ and most preferably greater than 7% $C_4AF$. The effectiveness of the subject higher trialkanolamines, such as TIPA, BHEHPA, T2BA or the like, relates to the amount of $C_4AF$ in the clinker. Clinkers with low $C_4AF$ contents, either due to low total iron or to a preponderance of $Fe^{II}$ at the temperature of solidification of the clinker melt phase or for any other reason, are not affected by the strength enhancing effects of the subject higher trialkanolamines. During $C_4AF$ hydration, ferric ions are produced in solution as a byproduct. Since ferric ions are extremely insoluble at the high pH found in hydrating cement, they immediately precipitate as an amorphous ferric hydroxide gel. This gel coats the cement grain and tends to retard hydration of the cement as a whole. The higher trialkanolamines may serve to complex with the iron at high pH and help to remove this iron-rich coating, thereby improving the strength development of the cement. The table in Example 4 clearly illustrates the variation in strength enhancement at 28 days when TIPA was added to cements varying in $C_4AF$ concentration.

The current method to determine the concentration of $C_4AF$ in a cement is by the Bogue calculation, as specified in ASTM C150. This calculation provides an estimate of the concentration of the major phases present in a cement based on an elemental analysis. The values obtained may, however, be inaccurate in many cases because the Bogue calculation does not account for differences that may occur in the thermal processing history of the cement clinker or for the presence of minor components. Because the Bogue calculation assumes the iron is present only in the $C_4AF$ phase, the calculated values for $C_4AF$ concentration will be in error when a significant fraction of the iron in a cement is present in phases other than $C_4AF$. For example, in the case of cement "L" (as illustrated in example 4), the $C_4AF$ concentration appears to be close to the normal concentration levels of the other cements, but it actually contains a low $C_4AF$ level. This suggests that the iron in this cement is not present in the $C_4AF$ solid solution as is normally the case (and assumed by the Bogue calculation), but is instead located in other phases.

For purposes of this invention, the concentration of $C_4AF$ in a cement will be calculated using data derived by x-ray diffraction (XRD) since these results are more representative of the actual $C_4AF$ concentration. Under this method, a cement sample is scanned in the region 30° to 35° $2\theta$ ($CuK_\alpha$). The heights of the 141 $C_4AF$ peak [$h(C_4AF)$] at 33.8° and the 440 $C_3A$ peak [$h(C_3A)$] at 33.3° are measured and the ratio of the 141 $C_4AF$ peak height to the 440 $C_3A$ peak height is determined. This peak height ratio is proportional to the actual $C_4AF/C_3A$ concentration ratio. However, the proportionality constant (K) is not known and cannot be measured in an unambiguous way. In order to estimate this constant, the $C_4AF/C_3A$ concentration ratio was estimated from Bogue calculated values for these two phases in cements where the Bogue calculation is expected to be accurate. These Bogue-calculated $C_4AF/C_3A$ concentration ratios were then divided by the calculated peak height ratio from XRD to determine the proportionality constant, K. K was computed for 10 cements and found to have a value of 1.39±0.47.

Next, this value of K, the XRD data, and the elemental analysis was used to compute the $C_4AF$ content for each cement. In order to do this, a mass balance was performed for alumina in the cement. The fact that all of the alumina must appear in the cement as $C_3A$, $C_4AF$, or as an impurity in the silicate phases can be expressed mathematically as $$A^{Total} = A^{C_3A} + A^{C_4AF} + \delta A^{Total},$$

where $\delta$ is defined to be the fraction of alumina which appears in the silicate phases. This equation can be rearranged to yield $$A^{Total}(1-\delta) = A^{C_4AF}(1 + A^{C_3A}/A^{C_4AF}).$$

The ratio $A^{C_4AF}/A^{C_3A}$ is related to the ratio $[C_4AF]/[C_3A]$ by the stoichiometry of the compounds involved, so that $$A^{C_4AF}/A^{C_3A} = 0.556 \, [C_4AF]/[C_3A].$$

A new constant, $K^*$, can be defined such that $$A^{C_4AF}/A^{C_3A} = K^*(h(C_4AF)/h(C_3A)),$$

where $K^* = 0.556 \, K$, K being the constant of proportionality defined above. Defining the peak-height ratio $$h(C_4AF)/h(C_3A) = r,$$

the mass balance can be rewritten $$A^{C_4AF} = A^{Total}(1-\delta)/(1 + 1/K^*r).$$

When the stoichiometric relationship between $C_4AF$ and A is employed, this can be written in the final form $$[C_4AF] = 4.77 \, A^{Total}(1-\delta)/(1 + 1/K^*r).$$

In general, the value of $\delta$ to be used in this equation is not known. However, an estimate of the $C_4AF$ content can be obtained by assuming that all of the alumina is in the $C_3A$ and $C_4AF$ phases, or $\delta = 0$. This estimate will give the highest possible value for the $C_4AF$ concentration threshold. Any value of $\delta > 0$ will lower the threshold below that computed for $\delta = 0$. Using this value for $\delta$, the value of K cited above, the value for r obtained from the XRD experiments, and the alumina content from the elemental analysis, the $[C_4AF]$ can be computed for any cement. The $C_4AF$ concentration was calculated for several cements, as shown in the column on the right in Table IV in example 4. (Note—The $C_4AF$ content of three cements (K, L, and O) were also measured using a technique described in Bulletin 166 of the Research and Development Laboratories of the Portland Cement Association. The $C_4AF$ content measured according to this bulletin agreed well with the $C_4AF$ concentration values obtained by XRD data in all these cases, whereas the Bogue calculated $C_4AF$ concentration values were inaccurate in two of the three cements (L and O).

Using the computed $[C_4AF]$, it appears that all of the cements in which the subject higher trialkanolamines provided strength enhancement have $[C_4AF]$ greater than 4.0%, whereas the two cements in which no strength enhancement was obtained have $[C_4AF]$ less than 4.0%. It appears, then, that a $C_4AF$ concentration greater than 4%, preferably greater than 5.5% and most preferably greater than 7% is required to provide useful strength enhancement at 7 and 28 days with the present additive.

It has been observed that the addition of the subject higher trialkanolamine to the portland cement, while enhancing the later age strength of the resultant cement mix, also tends to increase the amount of air entrained in the cement mix. Analysis of various cement mix samples revealed an increase in air entrainment in excess of 2% when compared to cement mixes containing no additive. Thus, a preferred embodiment of this invention is a stable, homogeneous mixture of the subject strength enhancing additive and an air detraining agent (ADA) capable of reducing or eliminating the increased air entrainment in the cement mix.

Various air detraining agents are known to those skilled in the art, and a choice of a particular agent is not critical per se to this invention, provided, however, that it is compatible with the particular higher trialkanolamine contemplated for use (i.e. non-degrading) and is, preferably, soluble therein, or can be made soluble therein through addition of other ingredients. Suitable air detraining agents include, but are not limited to, nonionic surfactants such as phosphates, including tributylphosphate, phthalates, including diisodecylphthalate, block copolymers, including polyoxypropylene-polyoxyethylene-block copolymers, and the like, or mixture thereof.

The higher trialkanolamine/ADA mixture may be admixed with the cement powder, or interground with the cement clinker. When intergrinding these additive mixtures during the finish milling, it is important to choose an ADA which is relatively non-volatile so that it may withstand the heat generated by the mill and thus not evaporate. The most preferred ADAs for use when intergrinding with the cement clinker are nonionic polyoxypropylene-polyoxyethylene block copolymers having a molecular weight of at least 2500.

The ratio of the subject higher trialkanolamine to ADA of the mixture is typically in the range of 1:(0.1-2) based on weight, and is preferably in the range 1:(0.15-0.40). The mixture can be added to cement in a dosage of up to 0.2% based on the weight of portland cement content, preferably less than 0.1% and most preferably between 0.005 and 0.03%.

As stated above, the subject additive can be used with certain portland cements to improve the 7 and 28 day compressive strengths of the resulting cement mix structure. The improved cement does not, however, provide any notable improved early strength and, therefore, conventional early strength enhancers can be incorporated into the portland cement to further improve the cement composition's properties. Agents capable of enhancing early strength include alkali metal salts, such as alkali metal hydroxides, sulfates, chlorides, acetates, formates, carbonates, silicates and the like. The preferred alkali metals are sodium and potassium. The alkali metal salt can be interground with the clinkers or added later including as an admixture just prior to structural formation. The alkali metal salt can be from various sources including kiln dust which is known to be rich in this material. The weight ratio of the subject trialkanolamine to alkali metal salt should be from about 0.002 to 4, preferably from about 0.01 to 1. Although alkali metal salts enhance early strength, they are generally believed to have a negative impact on later (28 day) strength. However, it has been found that a combination of these early strength enhancers with the higher trialkanolamine agents provided a cement composition which exhibits enhanced strength both in early (1 day) and latter (7 and 28 days) stages of cure.

Without further elaboration, it is believed that one skilled in the art, using the preceding detailed description can utilize the present invention to its fullest extent. The following examples are provided to illustrate the invention, but are not to be construed as limiting the invention in any way except as indicated in the appended claims. All parts and percentages are by weight unless otherwise indicated and additives are expressed as percent active ingredients as solids based on the weight of the cement (% s/c). Compressive strengths of the cement samples were determined in accordance with ASTM method C109.

The following examples were prepared using commercially available cements and clinkers. The following table (Table A) provides an elemental analysis of the cements and clinker as oxides and the corresponding clinker compound compositional analysis as calculated by the Bogue method (ASTM C150). The sample codes as used in this table will be used throughout the following examples to indicate which cements were used therein.

TABLE A

Analyses of Cements and Clinkers
Elemental Analysis As Oxides, % by Mass

| Cement | Na2O | K2O | MgO | CaO | Al2O3 | Fe2O3 | SiO2 | TiO2 | P2O5 | SO3 | L.O.I. | SrO | Mn2O3 | Total |
|---|---|---|---|---|---|---|---|---|---|---|---|---|---|---|
| A | 0.08 | 0.59 | 0.71 | 64.51 | 4.36 | 3.43 | 21.40 | 0.18 | 0.03 | 2.85 | 1.21 | 0.03 | 0.04 | 99.42 |
| B | 0.00 | 0.74 | 3.29 | 65.74 | 4.25 | 2.74 | 21.46 | 0.20 | 0.04 | 0.86 | 0.59 | 0.03 | 0.05 | 99.98 |
| C | 0.31 | 0.40 | 1.97 | 65.78 | 3.86 | 3.01 | 22.44 | 0.24 | 0.07 | 0.58 | 0.43 | 0.22 | 0.09 | 99.40 |
| D | 0.28 | 0.55 | 3.80 | 64.50 | 4.60 | 3.60 | 21.60 | 0.20 | 0.10 | 0.61 | 0.08 | 0.00 | 0.00 | 99.92 |
| E | 0.21 | 0.38 | 3.55 | 63.25 | 4.40 | 2.91 | 21.45 | 0.23 | 0.07 | 2.54 | 0.99 | 0.00 | 0.00 | 99.98 |
| F | 0.15 | 0.63 | 0.86 | 64.65 | 4.22 | 3.37 | 21.51 | 0.18 | 0.05 | 2.80 | 1.38 | 0.05 | 0.05 | 99.90 |
| G | 0.12 | 0.66 | 4.22 | 63.77 | 4.46 | 2.89 | 22.24 | 0.29 | 0.06 | 0.33 | 0.25 | 0.12 | 0.08 | 99.49 |
| H | 0.18 | 0.73 | 2.06 | 65.00 | 4.12 | 3.32 | 22.54 | 0.23 | 0.10 | 1.00 | 0.15 | 0.07 | 0.06 | 99.56 |
| I | 0.29 | 0.54 | 0.00 | 65.00 | 5.00 | 3.00 | 22.00 | 0.00 | 0.00 | 2.00 | 0.00 | 0.00 | 0.00 | 97.83 |
| J | 0.37 | 0.21 | 1.84 | 64.56 | 5.51 | 2.74 | 20.93 | 0.24 | 0.07 | 1.98 | 1.12 | 0.12 | 0.04 | 99.73 |
| K | 0.10 | 1.10 | 1.72 | 64.91 | 5.81 | 2.60 | 21.75 | 0.33 | 0.05 | 1.33 | 0.00 | 0.00 | 0.00 | 99.70 |
| L | 0.12 | 0.22 | 1.14 | 67.25 | 6.12 | 2.44 | 21.89 | 0.26 | 0.11 | 0.02 | 0.00 | 0.00 | 0.00 | 99.57 |
| M | 0.04 | 0.45 | 1.60 | 65.48 | 4.85 | 0.19 | 21.73 | 0.20 | 0.00 | 2.97 | 2.03 | 0.00 | 0.00 | 99.54 |
| N | 0.00 | 0.71 | 1.13 | 65.28 | 6.03 | 4.28 | 20.45 | 0.45 | 0.00 | 1.59 | 0.71 | 0.00 | 0.00 | 100.63 |
| O | 0.10 | 0.38 | 0.84 | 65.44 | 2.92 | 4.67 | 24.14 | 0.44 | 0.14 | 0.08 | 0.00 | 0.00 | 0.00 | 99.15 |
| P | 0.00 | 0.33 | 1.31 | 62.08 | 6.17 | 3.46 | 20.53 | 0.37 | 0.00 | 3.67 | 1.04 | 0.00 | 0.00 | 99.46 |
| Q | 0.45 | 0.28 | 2.73 | 60.95 | 3.77 | 2.19 | 21.59 | 0.30 | 0.00 | 2.55 | 1.92 | 0.00 | 0.00 | 96.73 |
| T | 0.00 | 0.32 | 3.03 | 58.99 | 4.63 | 4.70 | 19.80 | 0.34 | 0.00 | 2.30 | 4.04 | 0.00 | 0.00 | 98.15 |
| R | 0.00 | 0.64 | 2.24 | 64.56 | 4.65 | 2.13 | 23.76 | 0.22 | 0.02 | 0.95 | 0.44 | 0.00 | 0.02 | 99.63 |
| S | 0.23 | 0.47 | 1.84 | 65.31 | 5.04 | 2.63 | 23.18 | 0.29 | 0.16 | 0.46 | 0.00 | 0.00 | 0.00 | 99.61 |

Clinker Compound Compositions
Cement Compounds, ASTM C150 Calculation

| Cement | C3S | C2S | C3A | C4AF | Compd. Totals |
|---|---|---|---|---|---|
| A | 56.25 | 18.92 | 6.31 | 10.44 | 91.91 |
| B | 68.00 | 10.23 | 7.26 | 8.34 | 98.83 |
| C | 63.27 | 16.60 | 5.96 | 9.16 | 94.99 |
| D | 58.61 | 17.71 | 6.89 | 10.95 | 94.17 |
| E | 51.49 | 22.65 | 7.53 | 8.86 | 90.53 |
| F | 57.01 | 18.66 | 6.09 | 10.25 | 92.02 |
| G | 53.20 | 23.63 | 7.86 | 8.79 | 93.48 |
| H | 55.82 | 22.51 | 6.18 | 10.10 | 94.61 |
| I | 53.83 | 22.46 | 8.17 | 9.13 | 93.60 |
| J | 55.09 | 18.45 | 10.79 | 8.34 | 92.66 |
| K | 49.85 | 24.75 | 12.00 | 7.91 | 94.52 |
| L | 60.26 | 17.29 | 13.07 | 7.42 | 98.05 |
| M | 58.75 | 17.98 | 13.06 | 0.58 | 90.37 |
| N | 56.15 | 16.27 | 9.93 | 13.02 | 95.37 |
| O | 52.52 | 29.59 | 1.37 | 14.21 | 97.69 |
| P | 37.35 | 30.68 | 11.48 | 10.53 | 90.04 |
| Q | 46.30 | 26.97 | 7.08 | 6.66 | 87.01 |

TABLE A-continued

|   |       |       |       |       |       |
|---|-------|-------|-------|-------|-------|
| T | 43.00 | 24.33 | 5.22  | 14.30 | 86.85 |
| R | 43.64 | 35.20 | 9.35  | 6.48  | 94.67 |
| S | 47.75 | 30.43 | 10.10 | 8.00  | 96.29 |

EXAMPLE 1

This example illustrates the enhanced compressive strengths of mortars produced from six different cements with the addition of triisopropanolamine (TIPA) when compared with cements prepared with no additives or with triethanolamine (TEA). Two inch mortar cubes were produced from a number of commercially available cements using the procedure specified in ASTM C109. Additives, if used, were added to the mixing water before the addition of the cement, at a dosage of 0.0002 g of additive per gram of cement. Compressive strengths of the resulting cubes were measured at ages of 1, 7, and 28 days. In addition, x-ray diffraction patterns were obtained for each of the cements and the amount of $C_4AF$ present in the cement was determined using the calculation described in the specification. As is apparent from the data in Table I, the compressive strengths of cements in which TIPA was added exceeded those of cements containing no additives or TEA at 7 and 28 days, except in the case where the $C_4AF$ concentration was lowest (cement "M"). This shows that the addition of TIPA is only beneficial to the performance of those cements having at least 4% $C_4AF$.

TABLE I

Results of ASTM C109 Mortar Tests with TIPA and TEA
(w/c = 0.485, sand/cement = 2.75)

| Cement | Additive | Dosage, % s/c | % $C_4AF$ | Set-Time hrs. | Compressive Strength, psi |  |  |
|---|---|---|---|---|---|---|---|
|  |  |  |  |  | 1-Day | 7-Days | 28-Days |
| E | None | — | 9.26 | 5.42 | 1970 | 4990 | 6610 |
| E | TEA | 0.02 | 9.26 | 5.25 | 2100 | 4970 | 6980 |
| E | TIPA | 0.02 | 9.26 | — | 1870 | 6100 | 8120 |
| F | None | — | 8.69 | 4.12 | 1830 | 4380 | 5720 |
| F | TEA | 0.02 | 8.69 | 3.58 | 1860 | 4060 | 5400 |
| F | TIPA | 0.02 | 8.69 | 4.08 | 2190 | 4820 | 6590 |
| I | None | — | 8.38 | 4.37 | 1390 | 5140 | 6870 |
| I | TEA | 0.02 | 8.38 | 4.33 | 1360 | 4990 | 6470 |
| I | TIPA | 0.02 | 8.38 | 4.33 | 1380 | 6320 | 8180 |
| I | None | — | 8.38 | 5.13 | 1410 | 5140 | 6720 |
| I | TEA | 0.02 | 8.38 | 4.78 | 1430 | 4790 | 6710 |
| I | TIPA | 0.02 | 8.38 | 5.05 | 1410 | 6300 | 7990 |
| M | None | — | 1.35 | 3.07 | 3780 | 5710 | 7170 |
| M | TEA | 0.02 | 1.35 | 3.20 | 3420 | 5270 | 6270 |
| M | TIPA | 0.02 | 1.35 | 3.28 | 3410 | 5070 | 6560 |
| P | None | — | 8.90 | 4.13 | 1960 | 3980 | 4740 |
| P | TEA | 0.02 | 8.90 | 4.33 | 1880 | 3600 | 4680 |
| P | TIPA | 0.02 | 8.90 | 4.12 | 2100 | 4510 | 5560 |
| J | None | — | 7.65 | 3.72 | 1680 | 6240 | 6770 |
| J | TIPA | 0.02 | 7.65 | 3.72 | 1580 | 6580 | 7350 |

EXAMPLE 2

This example illustrates the increase in 28-day mortar strengths with increased dosage of triisopropanolamine (TIPA) up to the optimum concentration of 0.01% TIPA.

Two inch mortar cubes were produced from a number of commercially available cements using the procedure specified in ASTM C109. TIPA, if used, was added to the mixing water before addition of the cement. The TIPA dosage was varied in order to determine the optimum dosage rate. Compressive strength measurements at 1, 7, and 28 days show that optimal TIPA dosage is generally in the region of 0.01% to 0.02%. Higher dosages sometimes provide additional small increases in strength, but at a much higher additional cost. Significantly higher dosages may also result in decreased strength. The data are summarized in Table II.

TABLE II

Compressive Strengths of ASTM C109
Mortars with Varying TIPA Dosages[1]

| Cement | TIPA Dosage, % s/c | Set time, hrs[2] | Compressive Strength, psi |  |  |
|---|---|---|---|---|---|
|  |  |  | 1 Day | 7 Days | 28 Days |
| A | 0.0   | 3.2 | 3470 | 8030 | 9040  |
| A | 0.005 | 3.3 | 3670 | 8360 | 9280  |
| A | 0.01  | 3.1 | 3980 | 9060 | 10730 |
| A | 0.02  | 3.3 | 3790 | 8640 | 10730 |
| A | 0.03  | 3.2 | 4160 | 8410 | 10530 |
| A | 0.05  | 3.0 | 4100 | 8190 | 11020 |
| A | 0.07  | 3.3 | 3890 | 8930 | 10560 |
| A | 0.10  | 3.6 | 3880 | 8490 | 10050 |
| P | 0.0   | nm  | nm   | 3740 | 5100  |
| P | 0.005 | nm  | nm   | 4150 | 5100  |
| P | 0.01  | 4.1 | nm   | 4420 | 5450  |
| P | 0.02  | 4.0 | nm   | 4330 | 5360  |
| P | 0.03  | 4.3 | nm   | 4430 | 5160  |
| P | 0.04  | 4.1 | nm   | 4350 | 5440  |
| Q | 0.0   | 5.1 | 1650 | 4600 | 6650  |
| Q | 0.005 | 5.3 | 1700 | 4910 | 6940  |
| Q | 0.01  | 5.5 | 1730 | 5230 | 7460  |
| Q | 0.02  | 5.8 | 1720 | 5180 | 7660  |

[1]Test conditions were modified slightly for the experiments with Cement A; w/c = 0.385 (not 0.485), sand/cement = 2.5 (not 2.75).
[2]Measured with RMU Automatic Recording Penetrometers.

EXAMPLE 3

The results presented in earlier examples show that TIPA is generally superior to TEA in its ability to improve the 28 day strength of cements. However, a shortcoming of TIPA is its inability to improve the 1-day strength of most cements. Since TEA is known to be a good 1-day strength enhancer, it was expected that replacing some TIPA in additive formulations with TEA would improve performance of the additive at 1 day, at the expense of 28-day strength. In order to test this, a number of cements were produced in a laboratory-scale ball mill. In the first test, with results shown in Table III, cements consisting of 95% clinker and 5% gypsum were produced. Additives were dissolved in 10 ml of deionized water and added to the other materials after 100 revolutions of the mill. A total of 4000 revolutions were used to produce each cement. Two inch mortar cubes were produced from these cements according to the method specified in ASTM C109. The data in the table shows that replacement of TIPA with TEA improved the 1-day strength as expected, with the 1 day strengths of TIPA/TEA mixtures falling in between those of neat TIPA and neat TEA. Unexpectedly, however, the replacement of a fraction of the TIPA with TEA also had a positive impact on the 28-day strength. Although the 28-day strength of the cement containing neat TEA was far below that of the cement containing neat TIPA, and in fact was considerably below the blank, replacing some of the TIPA with TEA improved the 28-day strength.

TABLE III

Results of Laboratory Test Grinds with TIPA/TEA Mixtures

| Cement | Additive | Dosage % s/c | Set time, hrs[1] | Compressive Strength, psi | | |
|---|---|---|---|---|---|---|
| | | | | 1 Day | 7 Days | 28 Days |
| C | none | — | 5.43 | 1740 | 5250 | 7310 |
| C | TIPA | 0.02 | 5.27 | 2080 | 6270 | 7420 |
| C | TEA | 0.02 | 4.65 | 2240 | 5480 | 6800 |
| C | TIPA:TEA 1:3 | 0.02 | 4.83 | 2220 | 5430 | 8070 |
| C | TIPA:TEA 1:1 | 0.02 | 4.65 | 2140 | 6120 | 7680 |
| C | TIPA:TEA 3:1 | 0.02 | 4.82 | 2060 | 6360 | 8080 |

[1]Measured with RMU Automatic Recording Penetrometers.

EXAMPLE 4

This example shows that TIPA can be either interground with cement clinker or admixed with cement powder. In the cases where TIPA was interground, 0.5 g of TIPA was added to 2500 g of a clinker/gypsum mixture to obtain a 0.02% dosage of the additive. The amount of gypsum in the mixture varied between 3% and 5%. These ingredients were ground for 4000 revolutions of a laboratory ball mill at 110° C. to produce cements for testing. ASTM C109 mortar tests were conducted with these cements and with duplicate controls in which TIPA was not added. In Table IV, the 28-day compressive strength of the cubes containing TIPA are expressed as a percentage of the 28-day strength of the controls.

Tests with admixed TIPA were carried out similarly. Pre-ground commercial cements were employed for this work. ASTM C109 mortars were produced, with TIPA added to the mix water, before the addition of cement, to obtain the same 0.02% dosage. As before, the 28 day compressive strengths of these mortars are expressed as a percentage of the controls in Table IV.

In order to show that TIPA is not effective as a strength enhancer unless the cement contains a significant quantity of $C_4AF$, x-ray diffraction (XRD) measurements were performed on each of the cements (lab ground or commercial) used in these experiments. Only two cements, "M" and "L", performed poorly, and in these cases the concentration of $C_4AF$ was less than 4%. It appears, then, that unless the concentration of $C_4AF$ is above 4%, addition of TIPA to cement does not enhance the 7 and 28 day compressive strength.

TABLE IV

Correlation Between Strength Enhancement with TIPA and the Computed $C_4AF$ Concentration for 12 Cements

| Cement/ Clinker | Type of Addition[1] | [$C_4AF$] From Bogue | From calculation derived in text | 28 Day Strength of Cement with TIPA, % of Control |
|---|---|---|---|---|
| E | Ad | 8.855 | 9.263 | 123 |
| H | I.G. | 10.103 | 8.381 | 121 |
| I | Ad | 9.129 | 8.384 | 119 |
| I | Ad | 9.129 | 8.384 | 119 |
| C | I.G. | 9.159 | 8.831 | 117 |
| C | I.G. | 9.159 | 8.831 | 115 |
| F | Ad | 10.255 | 8.686 | 115 |
| C | I.G. | 9.159 | 8.831 | 112 |
| J | Ad | 8.338 | 7.649 | 109 |
| C | I.G. | 9.159 | 8.831 | 109 |
| G | I.G. | 8.794 | 9.126 | 109 |
| D | I.G. | 10.955 | 9.994 | 109 |
| K | I.G. | 7.912 | 7.162 | 107 |
| K | I.G. | 7.912 | 7.162 | 107 |
| B | I.G. | 8.338 | 9.972 | 104 |
| O | I.G. | 14.211 | 7.221 | 103 |
| C | I.G. | 9.159 | 8.831 | 102 |
| M | Ad | 0.578 | 1.350 | 91 |
| L | I.G. | 7.425 | 3.572 | 89 |
| L | I.G. | 7.425 | 3.572 | 84 |

[1]"Ad" = admixed, "I.G."-interground

EXAMPLE 5

As further evidence of the unexpected strength enhancing properties of TIPA, the relative strength enhancement at 28 days for various cements were compared when hydroxyethyl and hydroxypropyl derivatives of ammonia and hydroxyethyl and hydroxypropyl derivatives of ethylenediamine were admixed into respective samples of portland cements. Table V clearly shows the significant increase in strength enhancement when TIPA was admixed with a portland cement as compared to the TEA-containing cements (i.e. going from a hydroxyethyl to a hydroxypropyl derivative of ammonia). However there is no corresponding increase in strength enhancement when comparing the tetra(hydroxyethyl)ethylenediamine (THEED) containing cement to the tetra(hydroxypropyl)ethylenediamine (THPED) containing cement (i.e. going from a hydroxyethyl to a hydroxypropyl derivative of ethylenediamine) and, in fact, the data indicate there is actually a decrease in strength enhancement.

TABLE V

Difference in properties between hydroxyethyl and hydroxypropyl derivatives of ethylenediamine and ammonia

| Cement | Mode of Addition | Strength at 28 Days, % of Blank | | | |
|---|---|---|---|---|---|
| | | TEA | TIPA | THEED | THPED |
| F | Ad | 107 | 117 | 127 | 115 |
| E | Ad | 105 | 122 | 122 | 112 |

Ad = admixed

EXAMPLE 6

Several portland cements were produced by grinding a mixture of 2375 parts clinker H, 125 parts gypsum and 10 parts water for 4000 revolutions in a laboratory ball mill. In some cases, as shown in Table VI below, organic additives were added to the mill after the first 100 revolutions.

Using these cements, mortar cubes were produced for compressive strength tests according to the procedure specified in ASTM C109, and standard mortar samples for air content tests were produced according to ASTM C185. The results of these tests are shown in Table VI. Note that the addition of TIPA to the mix substantially improved the 7- and 28-day strengths despite a 2.51% increase in the air content. When surfactants were added along with the TIPA, the air content was reduced and a further increase in strength was achieved.

TABLE VI

| | TIPA/Air Detraining Agent (ADA) Mixtures | | | | | | |
|---|---|---|---|---|---|---|---|
| Additives | Blaine SSA, $m^2/kg$ | C-109 Mortar Flow, % | Setting Time $Hrs.^1$ | $C-185^3$ Mortar Air, % | Compressive Strength, psi | | |
| | | | | | 1-Day | 7-Days | 28-Days |
| None | 375 | 135 | 4.93 | 8.14 | 1390 | 4750 | 6630 |
| 0.02% TIPA | 371 | 131 | 4.45 | 10.65 | 2470 | 6020 | 7990 |
| 0.02% TIPA + 0.004% Surfactant $25R1^3$ | 390 | 133 | 4.38 | 7.27 | 2310 | 6170 | 8620 |
| 0.02% TIPA + 0.004% Surfactant $25R2^3$ | 282 | 134 | 4.35 | 8.03 | 2160 | 6140 | 8270 |
| 0.02% TIPA + 0.004% Surfactant $31R2^3$ | 385 | 133 | 4.18 | 8.57 | 2210 | 5830 | 8140 |

Notes:
[1] Determined using RMU penetrometers on the C109 mortar
[2] w/c = 0.63 for all C-185 tests
[3] Polyoxypropylene-polyoxyethylene block copolymers 25R1-2800 MW 25R2-3100 MW 31R2-3400 MW

EXAMPLE 7

Four tests were conducted using combinations of TIPA and an alkali salt, $Na_2SO_4$, with the results summarized in Table VII. In the first of these, test i, the additives were interground with the cement in a laboratory ball mill as described in Example 3. In the remaining tests (2-4) the additives were dissolved in the water used to prepare standard ASTM C109 mortars. The results show that the 28-day strength of the TIPA/$Na_2SO_4$ combination was above that of the mix with only $Na_2SO_4$ in each case. Also, the 1-day strengths of the mixes with TIPA and $Na_2SO_4$ were always above those mixes containing only TIPA. Thus, combinations of TIPA and $Na_2SO_4$ provide improved performance over a range of ages, relative to the use of the compounds individually.

TABLE VII

| Test | Cement | Additives | Compressive Strength, psi | | |
|---|---|---|---|---|---|
| | | | 1 Day | 7 Days | 28 Days |
| 1 | O | none | 520 | 4110 | 6210 |
| | O | 0.02% TIPA | 580 | 3740 | 6800 |
| | O | 1.0% $Na_2SO_4$ | 520 | 3810 | 5230 |
| | O | 0.02% TIPA + 1.0% $Na_2SO_4$ | 660 | 4570 | 6720 |
| 2 | T | none | 1220 | 4530 | 6320 |
| | T | 0.02% TIPA | 1320 | 5060 | 7160 |
| | T | 1.0% $Na_2SO_4$ | 1760 | 4120 | 5030 |
| | T | 0.02% TIPA + 2.0% $Na_2SO_4$ | 1800 | 4960 | 6390 |
| 3 | Q | none | 1290 | 3780 | 6010 |
| | Q | 0.02% TIPA | 1420 | 4210 | 7070 |
| | Q | 0.02% $Na_2SO_4$ | 1410 | 4010 | 6120 |
| | Q | 0.02% TIPA + 0.02% $Na_2SO_4$ | 1440 | 4250 | 6910 |
| | Q | 0.02% TIPA + 0.04% $Na_2SO_4$ | 1530 | 4280 | 6820 |
| 4 | T | none | 1300 | 4110 | 6120 |
| | T | 0.02% TIPA | 1510 | 4610 | 6740 |
| | T | 0.02% TIPA + 0.02% $Na_2SO_4$ | 1610 | 4800 | 6830 |
| | T | 0.02% TIPA + 0.10% $Na_2SO_4$ | 1810 | 5000 | 6940 |
| | T | 0.02% TIPA + 0.50% $Na_2SO_4$ | 2020 | 4850 | 6520 |

Note:
In test 1 the ingredients were interground with the cement. In the remaining tests the additives were admixed.

EXAMPLE 8

Example 3 contrasts performance of TIPA from that of TEA; specifically, TIPA is far superior as a 7- and 28-day strength enhancer Another higher molecular weight trihydroxyalkylamine, N,N-bis(2-hydroxyethyl)2-hydroxypropylamine (BHEHPA) was used and compared with TEA in the same manner as Example 3 except that the additives were admixed with the cement by predissolving them in the mix water used to prepare standard ASTM C109 mortars. Results are shown in Table VIII. The substantial improvement in the 28-day strength shown when this additive was admixed with cement F indicates that this compound has later-age strength-enhancing properties similar to TIPA, while being distinctly different from TEA.

TABLE VIII

| Additive | Flow % | Set Time, hrs | Compressive Strength, psi | | |
|---|---|---|---|---|---|
| | | | 1 Day | 7 Days | 28 Days |
| none | 104 | 4.13 | 1830 | 4380 | 5720 |
| TEA | 111 | 3.58 | 1860 | 4060 | 5400 |
| BHEHPA | 108 | 3.67 | 1900 | 4470 | 6350 |
| TIPA | 117 | nm | 2190 | 4820 | 6590 |

EXAMPLE 9

The higher trihydroxyalkylamine, tris(2-hydroxybutyl)amine (T2BA), was produced by reacting 1 mole of ammonia (in the form of an aqueous ammonium hydroxide solution) with 3 moles of 1,2-epoxybutane. NMR spectroscopy was used to confirm that the desired chemical product had been obtained This product was then interground with clinkers R and S using the procedure in Example 3, with the results of mortar tests conducted with these cements shown in Table IX. Note that at the 0.02% dosage, T2BA is an excellent 7 and 28-day strength enhancer At the 0.01% dosage with clinker R, good strength enhancement was observed at 7 days. At this dosage, however, the 28-day strength was neither improved or adversely affected, showing that the threshold dosage for 28-day strength enhancement by T2BA was not reached. The threshold dosage, which will vary from cement to cement, can be readily determined for any particular cement.

TABLE IX

| Clinker | Additive | Flow % | Set time, hrs | Compressive Strength, psi | | |
|---|---|---|---|---|---|---|
| | | | | 1 Day | 7 Days | 28 Days |
| R | none | 132 | 4.78 | 1140 | 4290 | 6990 |
| R | 0.01% T2BA | 133 | 4.50 | 1300 | 4560 | 6950 |
| R | 0.02% T2BA | 134 | 4.53 | 1340 | 4750 | 7420 |
| S | none | 130 | 5.38 | 1840 | 6150 | 7610 |
| S | 0.02% T2BA | 152 | 5.17 | 2140 | 6430 | 8450 |

What is claimed:

1. An improved hydraulic portland cement composition comprising a portland cement having at least 4% $C_4AF$ component therein in combination with at least one higher trialkanolamine having at least one $C_3$–$C_5$ hydroxyalkyl group, said amine being present in an amount up to 0.2 weight percent based on the cement weight which is sufficient to increase the 7 and 28 day compressive strength of a cement mix formed with said composition.

2. The composition of claim 1 wherein the trialkanolamine is present in from 0.005 to 0.03 weight percent.

3. The composition of claim 1 wherein the portland cement contains at least 5.5 weight percent $C_4AF$.

4. The composition of claim 1 wherein the portland cement contains at least 7 weight percent $C_4AF$.

5. The composition of claim 2 wherein the portland cement contains at least 7 weight percent $C_4AF$.

6. The composition of claim 1 wherein the composition further contains a water-soluble alkali metal salt, said trialkanolamine and said salt being present in a weight ratio of from about 0.002 to 4.

7. The composition of claim 1 wherein the composition further contains an effective amount of at least one cement admixture selected from set accelerators, air entrainers, air detrainers, water reducers, and set retarders.

8. The composition of claim 7 wherein the composition contains a polyoxypropylene-polyoxyethylene block copolymer having a molecular weight of at least 2500.

9. The composition of claim 7 wherein the composition contains an effective amount of a set accelerator comprising triethanolamine.

10. The composition of claim 1, 2, 3, 4, 5, 6, 7, 8, or 9 wherein the higher trialkanolamine is selected from triisopropanolamine, N,N-bis(2-hydroxyethyl)-N-(2-hydroxypropyl)amine, tris(2-hydroxybutyl)amine and mixtures thereof.

11. An improved hydraulic cement mix comprising a portland cement composition of claim 1, 2, 3, 4, 5, 6, 7, 8, or 9, water in at least a sufficient amount to effect hydraulic setting of the cement and particulate selected from fine aggregate, coarse aggregate and mixtures thereof.

12. A structure formed from a hydraulic cement mix containing, as its binding agent, the cement composition of claim 1, 2, 3, 4, 5, 6, 7, 8 or 9.

* * * * *